US005442382A

United States Patent [19]

Pfeuffer

[11] Patent Number: 5,442,382

[45] Date of Patent: Aug. 15, 1995

[54] ELECTROPHOTOGRAPHIC PRINTER WITH MEDIA SPEED CONTROL

[75] Inventor: Joseph J. Pfeuffer, Spokane, Wash.

[73] Assignee: Output Technology Corporation, Spokane, Wash.

[21] Appl. No.: 954,972

[22] Filed: Sep. 30, 1992

Related U.S. Application Data

[63] Continuation of Ser. No. 770,669, Oct. 1, 1991, abandoned.

[51] Int. Cl.[6] .................... G01D 15/24; G01D 9/42; G03G 21/00

[52] U.S. Cl. .................... 346/136; 355/311; 347/139; 347/900; 347/262

[58] Field of Search .................... 346/153.1, 107 R, 108, 346/107 A, 136; 355/311

[56] References Cited

U.S. PATENT DOCUMENTS

| | | | |
|---|---|---|---|
| 3,698,006 | 10/1972 | Ovshinsky | 346/108 |
| 4,257,053 | 3/1981 | Gilbreath | 346/108 |
| 4,551,732 | 11/1985 | Rogers | 346/108 X |
| 4,709,271 | 11/1987 | Yamaguchi et al. | 346/107 R X |
| 4,835,545 | 5/1989 | Mager et al. | 346/108 X |
| 4,893,135 | 1/1990 | Jamzadeh | 346/108 |
| 4,912,490 | 3/1990 | Negoro et al. | 346/160 |
| 4,926,270 | 5/1990 | Sakamoto | 358/498 |
| 5,136,316 | 8/1992 | Punater et al. | 346/153.1 |
| 5,142,304 | 8/1992 | Sato et al. | 346/108 |

*Primary Examiner*—Benjamin R. Fuller
*Assistant Examiner*—Randy W. Gibson
*Attorney, Agent, or Firm*—Wells, St. John, Roberts, Gregory & Matkin

[57] ABSTRACT

A continuous-form electrophotographic printer 10 measures velocity information each time a new continuous-form media 12 is loaded into the printer to compensate for differences in media, printer wear, and variations in manufacturing tolerances. The continuous-form electrophotographic printer 10 includes a media motion assembly 53 which moves the continuous-form media 12 at a constant velocity initially past an image transfer station 20 and then past an image fixing station 22. A media motion sensor 49 measures the movement of the media 12 and outputs a signal at equal predetermined segments of the media. An image forming device 60 at the image transfer station 20 places multiple scan lines at a predetermined scan rate on a drum 28. A scan line sensor 78 senses each scan line. A speed control system 52 varies the velocity of the media for sequential segments of media and counts the number of scan lines per media segment. The speed control system 52 compares the actual number of scan lines to a predetermined optimum number of scan lines, and then adjusts the velocity of the media based upon the comparison. As a result, the media is moved at a velocity which permits the optimum number of scan lines per media segment.

4 Claims, 3 Drawing Sheets

Fig. 1
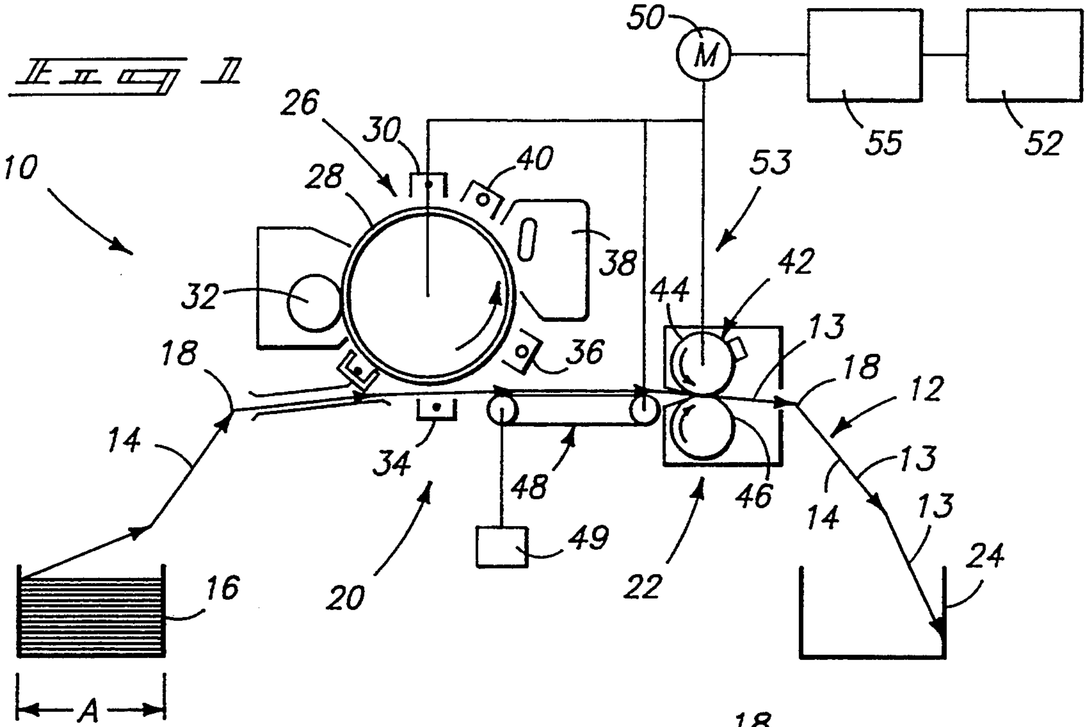
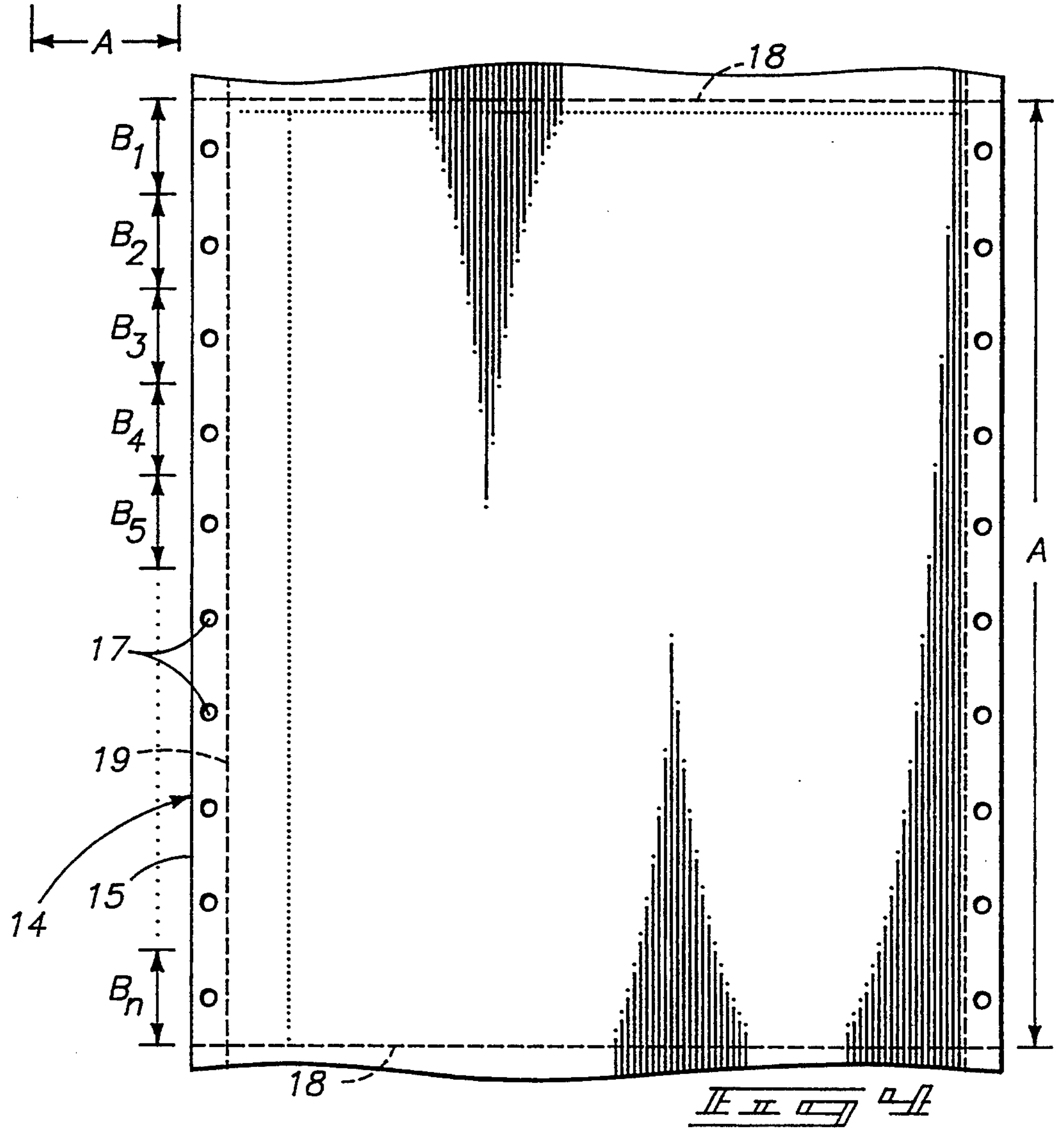
Fig. 4

ELECTROPHOTOGRAPHIC PRINTER WITH MEDIA SPEED CONTROL

RELATED PATENT DATA

This patent resulted from a continuation application of U.S. patent application Ser. No. 07/770,669, filed Oct. 1, 1991, now abandoned.

TECHNICAL FIELD

The present invention relates to continuous-form electrophotographic printers.

BACKGROUND OF THE INVENTION

Conventional electrophotographic printers are constructed with an image fixing station spaced downstream from an image transfer station. Print media, such as paper, is moved through the image transfer station and then through the image fixing station. At the image transfer station, an electrophotographic image is transferred to the print media. At the image fixing station, the image is affixed to the print media. The print media is moved through the stations by a media motion assembly which typically includes a roller assembly located at the image fixing station, a guidance system positioned intermediate of the image transfer station and the image fixing station, and a motor connected to drive the roller assembly and the guidance system.

To form an electrophotographic image on a print media, an image forming device at the image transfer station places multiple scan lines at a preset scan rate on a cylindrical photoconductive drum. A series of scan lines forms the desired image on the drum. The drum is then rotated adjacent the print media to transfer the image to the print media, which is moving through the image transfer station and past the drum at a constant velocity. The media motion assembly ensures that the media moves at a constant velocity; otherwise, image quality is severely diminished.

The velocity of the media through the image transfer station and the scan rate of the image forming device are independent of each other. However, for optimum printing quality, the media velocity and scan rate must be synchronized. For example, in one electrophotographic printer, the optimum printing synchronization may be to provide 300 scan lines per inch of print media. Accordingly, the media motion assembly must move the print media past the image transfer station at a velocity which permits the drum to transfer 300 scan lines per inch to the print media.

Electrophotographic printers are required to print images on many types of print media. In addition to printing on standard 8½"×11" paper, the printers must print images on print media which is non-standard in length, width, thickness and/or weight. One common printing application is printing text or graphics on a continuous roll of labels. The roll of labels is narrower than standard paper, and has varying thickness due to the thick labels being spaced apart on the thin backing paper. Due to variations in size and weight of print media, each print media has its own optimum velocity at which it should be moved through the electrophotographic printer.

Prior art electrophotographic printers print satisfactorily on standard print media, but often print poorly on non-standard print media. Part of the problem is that the printers are designed to move the media at a constant velocity regardless of the size and weight of that media. Thus, when non-standard print media is used, the printers move the media at the same velocity as a standard print media, rather than moving the .media at a velocity appropriate for that particular print media. Using the above example of 300 scan lines per inch, the printers may, for example, move the standard print media at 300 scan lines per inch, but only move the non-standard print media at 295 scan lines per inch. This error of five scan lines per inch cumulates over each sheet of print media. For a standard 8½"×11" paper, the total error will be 55 scan lines (i.e., 5 scan lines per inch×11 inches). This error is further compounded over a series of sheets in continuous-form printing.

Apart from media considerations, printers naturally age and wear over time. As a result, the media velocity and/or the scan rate change over time which also introduces error into the synchronization of media velocity and scan rate. Additionally, variations in manufacturing tolerances in new parts may introduce error. The cumulative effect of the errors introduced by media differences, printer wear, and variations in manufacturing tolerances may result in poor print quality.

An advantage of the present invention is to provide an electrophotographic printer which adjusts the print media velocity when each new print media is initially loaded into the printer. In this manner, the desired velocity is regularly measured and updated to compensate for any error introduced by change in print media (size or weight), printer age and wear, or variations in manufacturing tolerances.

These and other advantages of this invention will become apparent upon reading the following detailed description of a preferred embodiment.

BRIEF DESCRIPTION OF THE DRAWINGS

The preferred embodiment of the invention is described below with reference to the accompanying drawings, wherein like numerals reference like elements, in which:

FIG. 1 is a side elevation schematic of a preferred embodiment of a continuous-form electrophotographic printer of the present invention illustrating the continuous-form media being initially conveyed past an image transfer station and then past an image fixing station to print images onto individual sheets of the continuous-form media;

FIG. 4 depicts an individual sheet of the continuous-form print media illustrating the speed synchronization operation of the electrophotographic printer of the present invention.

DETAILED DESCRIPTION OF THE PREFERRED EMBODIMENT

This disclosure of the invention is submitted in furtherance of the constitutional purposes of the U.S. Patent Laws "to promote the progress of science and useful arts" (Article 1, Section 8).

Figure 2:
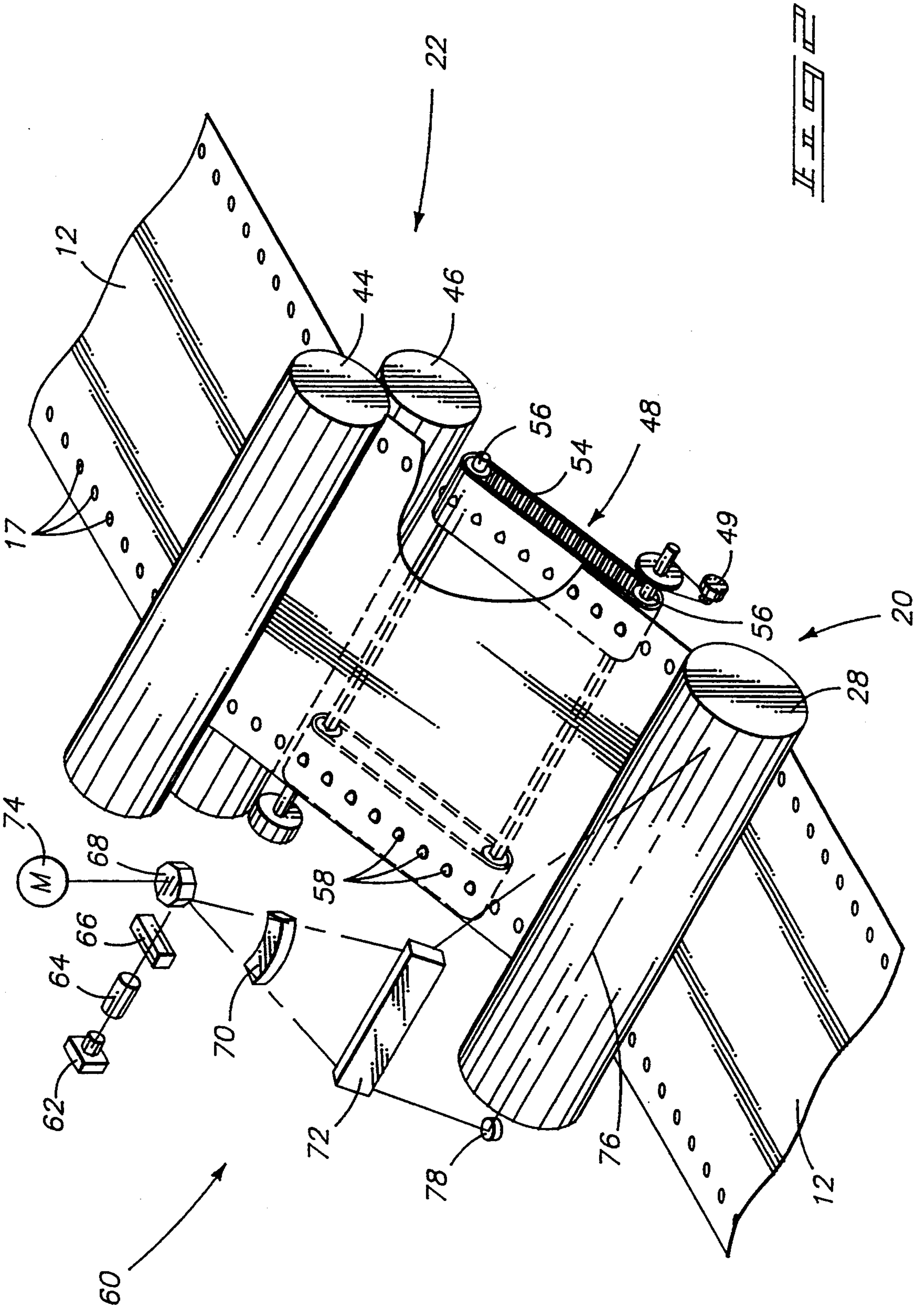
FIG. 2 is a perspective view of the electrophotographic printer of the present invention illustrating an image forming device.

FIGS. 1 and 2 illustrate a preferred embodiment of an electrophotographic printer 10 designed to print on a continuous-form media 12. Preferably, the continuous-form media 12 is a "fan-folded" type having individual sheets (depicted as an arrow 14) interconnected at leading and trailing edges. Alternatively, the continuous-form media 12 may be one continuous sheet which is later cut to form individual sheets. Each individual sheet 14 has a length A between a leading edge and a trailing edge.

The individual sheets 14 are interconnected at an intersheet boundary 18, which is preferably defined by perforations that enable each sheet 14 to be readily separated from the adjacent sheet of the continuous-form media 12 after the printing has been completed (see FIG. 4). Each of the individual sheets 14 has side sections 15 with feed perforations or holes 17 formed therein to facilitate accurate movement of the continuous-form media 12 relative to the printer 10. Each of the sheets 14 may have side separation perforations 19 for enabling the side sections 15 to be separated from the side of the individual sheets at the conclusion of the printing process.

As shown in FIG. 1, the continuous-form media 12 is moved from an unprinted storage container 16, past an image transfer station 20 and an image fixing station 22, and deposited into a printed storage container 24. During an initial load phase, a new continuous-form media is loaded into the printer 10. For example, the new media may be loaded into the printer to restock the supply of media, or to change from one type of media to a different type. The first few individual sheets on continuous-form media 12 shall be referred to as "leader sheets" and referenced generally with numeral 13.

The printer 10 has an image transfer assembly 26 at the image transfer station 20 for transferring an electrophotographic image from an optical photo conductor (OPC) transport or drum 28 onto the individual sheets 14. The OPC drum 28 preferably includes photoreceptors for producing an electrostatic image on the outer periphery of the drum. The image is generated from an image generator 30, such as a laser or an array of LEDs. The peripheral portion of the drum 28 passes a developer or toner applicator 32 which places a toner or dry ink material on the drum 28 to form a toner image. An image formation device 34 is located at the image transfer station 20 opposite the drum 28 for transferring the toner image from the drum 28 to the individual sheets 14 as the drum 28 is rotated and the sheets 14 pass through the image transfer station 20.

The image transfer assembly 26 further includes a charge eliminating electrode 36 positioned downstream of the path of the drum 28 for discharging the photoreceptors subsequent to the image transfer. A drum cleaning unit 38 is positioned farther downstream of the movement of the drum 28 to remove any excess or remaining toner or dry ink to prepare the drum 28 for a new image. A charging electrode 40 is utilized downstream of the drum cleaning unit 38 to recharge the photoreceptors on the drum 28.

The printer 10 also includes a roller-fusing assembly 42 at the image fixing station 22 for fusing the toner or dry ink powder to the individual sheets 14 to complete the printing process. In the preferred embodiment, the roller-fusing assembly 42 includes a fuser roller 44 that is heated to a temperature sufficient to fuse the toner as the sheets 14 pass through the image fixing station 22. In conjunction with the fuser roller 44, a pressure roller 46 presses the continuous-form media 12 firmly against the fuser roller 44 to increase the heat conductivity from the fuser roller 44 to the sheet 14. The pressure roller 46 also assists in moving the continuous-form media 12 through the printer 10.

The printer 10 preferably includes a tractor assembly 48 positioned intermediate of the image transfer station 20 and the image fixing station 32, although other guidance systems may be employed. The tractor assembly 48 guides the continuous-form media 12 from the image transfer station 20 to the image fixing station 22. As shown in FIG. 2, the tractor assembly 48 includes a pair of belts 54 between pulleys 56. The belts 54 have projections 58 which project through the holes 17 in the continuous-form media 12 to facilitate movement and alignment of the media 12.

A media motion sensor 49 is connected to the tractor assembly 48 to measure the movement of the continuous-form media 12. The media motion sensor 49 outputs a motion signal each time the continuous-form media 12 moves a predetermined segment of media. For example, the media motion sensor 49 may output the motion signal every time the continuous-form media 12 is moved one-half inch. In the preferred embodiment, the media motion sensor 49 is a tachometer.

A stepper motor 50 drives the drum 28, the fuser roller 44, and the tractor assembly 48. Preferably, the stepper motor 50 drives the drum 28 and the fuser roller 44 at the same rotational speed, and the tractor assembly 48 at a slightly slower speed to provide appropriate drag on the continuous-form media 12. The drag prevents the continuous-form media 12 from "bubbling" or "bowing" at the roller-fuser assembly 42. The tractor assembly 48 includes a slip clutch (not shown) which enables the belts 54 to move at the same speed as the continuous-form media 12. In other embodiments, the stepper motor 50 may drive only the fuser roller 44, or the fuser roller 44 in combination with either the drum 28 or the tractor assembly 48. In still another embodiment, multiple stepper motors may be employed, whereby one stepper motor is employed to drive the fuser roller 44 and a second stepper motor is employed to drive the drum 28.

The stepper motor 50 and the fuser roller 44 compose a media motion assembly 53 which moves the continuous-form media 12 past the image transfer station 20 and the image fixing station 22 at a constant velocity. The media motion assembly 53 may also include the tractor assembly 48.

A speed control system 52 is operatively coupled to control the rotational speed of the stepper motor 50 through an incremental media motion driver circuit 55. The speed control system 52 is described in more detail with reference to FIG. 3.

As shown in FIG. 2, an image forming device 60 at the image transfer station 20 includes a laser 62, a collimator lens 64, a beam shaper 66, a polygonal mirror 68, a lens 70, and a reflecting mirror 72. The polygonal mirror 68 is rotated by a motor 74 at a constant scan rate. As the polygonal mirror 68 is rotated, a scan line 76 is placed on the drum 28. A scan line sensor 78 is positioned adjacent the drum 28 to sense the scan line 76. The scan line sensor 78 outputs a scan line signal to the speed control system 52, and will be discussed below in more detail with reference to FIG. 3.

The image forming device 60 places multiple scan lines 76 on the drum 28. The scan lines combine to form electrophotographic images which are transferred by the drum 28 to the continuous-form media 12.

As mentioned above, the motor 74 rotates the polygonal mirror 68 at a constant scan rate. Also, the media motion assembly 53 moves the continuous-form media 12 past the image transfer station 20 at a constant velocity. The number of scan lines placed on any given segment of the continuous-form media 12 is therefore dependent upon the synchronization of the scan rate and the velocity of the continuous-form media 12 past the image forming station 20. For example, to obtain 300 scan lines per inch, the velocity of the continuous-form media 12 must be such that 300 scan lines are transferred from the drum 28 in a one inch segment of the continuous-form media 12.

Figure 3:
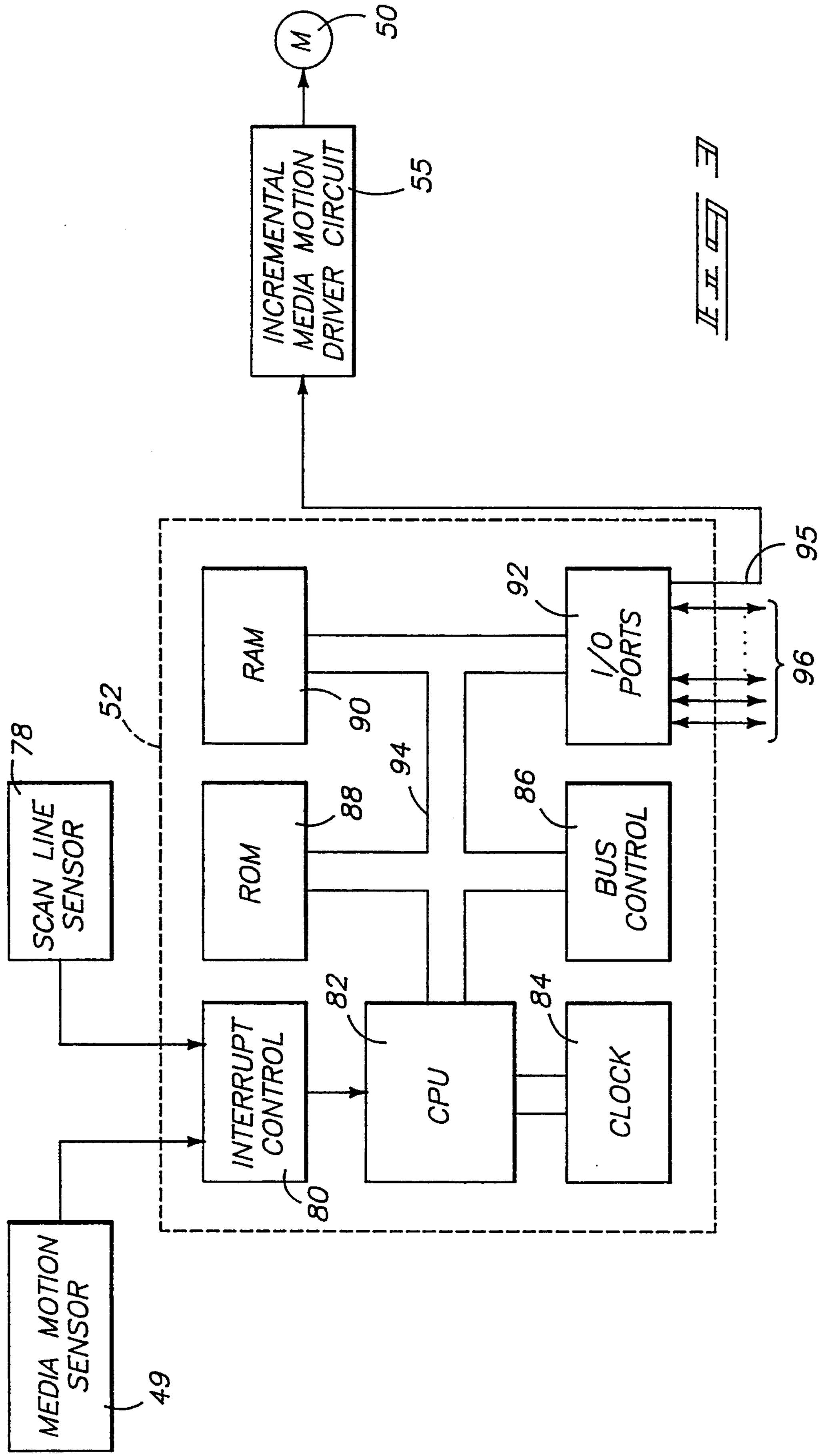
FIG. 3 is a block diagram of a speed control system according to the present invention.

FIG. 3 illustrates the speed control system 52 according to the preferred embodiment of the present invention. The speed control system comprises an interrupt control 80, a CPU 82, a clock 84, a BUS control 86, a read-only memory (ROM) 88, a random access memory (RAM) 90, an I/O port 92, and a bus 94. The interrupt control 80 is coupled to receive the motion signal from the media motion sensor 49 and the scan line signal from the scan line sensor 78. An I/O line 95 couples the speed control system 52 to the incremental media motion driver circuit 55, which drives the stepper motor 50. The I/O lines 96 couple the speed control system 52 to other printer components, such as a raster image processor, a scanning driver, and various printer sensors.

The speed control system 52 uses the motion signals and the scan line signals to synchronize the scan rate with the velocity of the continuous-form media 12 past the image transfer station. The synchronization is performed during an initial load phase whenever new media is loaded into the printer 10. As the leader sheets 13 are being moved through the printer 10 during the load phase, the speed control system 52 sequentially varies the velocity of the media 12 for a series of equal media segments. The segments are measured by the media motion sensor 49 which outputs a motion signals as the media travels a predetermined distance. The control system 52 counts the number of scan line signals received during each media segment to compute the actual number of scan lines per predetermined media segment. The speed control system 52 then compares the actual number of scan lines to an optimum number of scan lines and adjusts the velocity of the media for the next media segment based upon the comparison.

A more detailed explanation of the operation of the present invention will now be described with reference to FIGS. 1–4. During an initial load phase, the leader sheets 13 of the continuous-form media 12 are loaded into the printer (FIG. 1). The first leader sheet is fed through the printer 10 until the leading edge is positioned in the roller-fusing assembly 42. The printer 10 then conducts initialization procedures as the first leader sheet 13 is advanced forward until the leading edge of the second leader sheet 13 (i.e., the intersheet boundary 18 between the first and second leader sheets) is positioned in the roller-fusing assembly 42.

Following these initialization procedures, prior art printers are generally ready to print. The electrophotographic printer 10 of the present invention, however, uses the second leader sheet 13 to conduct a series of velocity tests. Beginning at the leading edge of the second leader sheet, the speed control system 52 directs the media motion assembly 53 to maintain a constant velocity for a media segment $B_1$ of the second leader sheet (FIG. 4). The continuous-form media 12 is already moving at a constant velocity when the second leader sheet reaches the roller-fusing assembly 42 because the initialization procedures were just conducted on the preceding leader sheet. The segment $B_1$ is measured by the media motion sensor 49, which outputs a motion signal to the interrupt control 80 when the media 12 has moved the segment $B_1$. For example, the distance $B_1$ may be a one-half inch segment of the sheet 14.

While the media is moving through the segment $B_1$, the scan line sensor 78 generates a scan line signal as each scan line 76 is placed on the drum 28. Generally, no image is being formed on the drum; but, the motor 74 is still rotating the polygonal mirror 68 at the constant scan rate employed during normal printing. The scan line sensor 78 outputs each scan line signal to the interrupt control 80, which interrupts the CPU 82. The CPU 82 maintains a count of the scan line signals and stores the count in the RAM 90. The CPU 82 continues counting until it receives an interrupt regarding the receipt of the motion signal indicating that the sheet 14 has travelled the segment $B_1$. The number of scan complete signals received between motion signals corresponds to the actual number of scan lines placed on the drum 28 in the media segment $B_1$.

The CPU 82 compares the total number of scan line signals with an optimum number of scan lines per predetermined media segment stored in the ROM 88. The optimum number of scan lines is a predetermined number based on the printer configuration. For example, the optimum number of scan lines in the electrophotographic printer 10 may be 300 scan lines per inch, or 150 scan lines per one-half inch. Assuming that the CPU 82 counts 155 scan line signals and the optimum number of scan lines is 150 per one-half inch, the CPU 82 would compute an error of +5 lines per media segment (which indicates that the media is moving too slowly for optimum printing).

If the actual number of scan lines does not equal the optimum number of scan lines, the CPU 82 derives an adjustment value to adjust the velocity of the media for the next media segment $B_2$ to a new constant velocity. The CPU 82 then counts the number of scan line signals while the media moves at the new constant velocity to compute the actual number of scan lines for media segment $B_2$. Perhaps this time, the CPU 82 counts 148 scan line signals (indicating that the media is moving too rapidly). The CPU 82 again derives an adjustment value and adjusts the velocity of the media for the next media segment $B_3$.

The counting and adjustment procedure continues until the media velocity is appropriately synchronized with the scan rate to provide the optimum number of scan lines per media segment. For example, if the individual sheet 14 is a standard $8\frac{1}{2}'' \times 11''$ sheet and the media segment is one-half inch, the printer 10 has twenty-two segments to obtain velocity data. Typically, the velocity and scan rate are synchronized within a few adjustments. However, the procedure is continued until the trailing edge of the second leader sheet to provide as much velocity information as possible for the newly loaded media.

In the preferred embodiment, the CPU 82 derives the adjustment value by employing a look-up table stored in the ROM 88. The table lists adjustment values in relation to the results obtained by comparing the actual number of scan lines (i.e., the number of scan line signals counted for a given segment) to the optimum number of scan lines. From the example above, assume the CPU 82 counted 155 scan line signals and the optimum number is 150, yielding a difference yields a +5. This result indicates that the media is moving too slow. The table would list +5 across from an adjustment value which is expected to increase the velocity of the media some specified amount so that the optimum number of scan lines per segment may be achieved by the corrected velocity.

The table is advantageous because it permits interpolation between listed values. The interpolation may be a first degree interpolation or a second degree interpolation, depending upon the accuracy desired.

An alternative approach to employing a look-up table is to adjust media velocity by changing the speed of the stepper motor 50 according to an algorithm stored in the ROM 88. The speed of the stepper motor 50 can be changed by a small percentage based upon the present error between the actual and optimum number of scan lines. For example, one approach is to compute a new motor speed according to the following equation:

$$MS(i) = \left[\frac{(ALS - OSL)}{OSL}\right] \times MS(i-1) + MS(i-1)$$

wherein MS(i) represents the new motor speed of the stepper motor 50, MS(i−1) represents the previous motor speed, ALS represents the actual number of scan line for a media segment, and OSL represents the optimum number of scan lines for that media segment.

The printer according to the present invention is advantageous over the prior art printers in that print quality is not diminished due to the effects of printing non-standard media, printer aging and wear, and variations in manufacturing tolerances. The printer of the present invention adjusts the velocity of the print media each time new media is loaded into the printer to compensate for such effects.

In compliance with the statute, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A continuous-form electrophotographic printer for printing images on a continuous-form media, the media having a body and a leader section at one end of the body, the leader section being moved through the printer during an initializing load phase, the printer comprising:

a media motion assembly for moving a leader section of a continuous-form media at a selected velocity past an image transfer station, the leader section being sectioned into multiple media segments;

an image forming device at the image transfer station for placing multiple scan lines at a predetermined scan rate on a photoconductive image device; and an initialization speed control system for determining during an initializing load phase a desired constant media velocity for the continuous-form media to obtain an optimum number of scan lines per media segment, the speed control system moving the leader section at different constant velocities for consecutive media segments and counting an actual number of scan lines for each of the media segments, the speed control system comparing the actual number of scan lines to the optimum number of scan lines and calibrating the media motion assembly to move the media at the desired constant media velocity which causes the actual number of scan lines per media segment to equal the optimum number of scan lines per media segment;

the media motion assembly maintaining the desired constant media velocity throughout printing of a remaining body of the continuous-form media.

2. A continuous-form electrophotographic printer according to claim 1 wherein:

the speed control system compares the actual number of scan lines to the optimum number of scan lines to compute a difference error; and the speed control system includes a memory which stores a table of adjustment values in relation to the difference error, the speed control system selecting a subsequent constant velocity based upon an adjustment value read from the table for the related difference error, the subsequent constant velocity reducing the difference error between the actual number of scan lines per media segment and the optimum number of scan lines per media segment.

3. A continuous-form electrophotographic printer for printing images on a continuous-form media, the media having a body and a leader section at one end of the media, the leader section being moved through the printer during an initializing load phase, the printer comprising:

a media motion assembly for moving a leader section of a continuous-form media at a selected velocity past an image transfer station, the leader section being sectioned into multiple media segments;

an image forming device at the image transfer station for placing multiple scan lines at a predetermined scan rate on a photoconductive image device;

the media motion assembly including a stepper motor having a selectable step rate to advance the continuous-form media a selected number of steps per scan line; and a speed control system for determining during an initializing load phase a desired step rate for the stepper motor to obtain an optimum number of scan lines per media segment, the speed control system changing a step rate of the stepper motor for consecutive media segments of the leader section and counting an actual number of scan lines for each of the media segments, the speed control system comparing the actual number of scan lines to the optimum number of scan lines and selecting a step rate which causes the actual number of scan lines per media segment to equal the optimum number of scan lines per media segment;

the stepper motor maintaining the desired step rate throughout printing of a remaining body of the continuous-form media.

4. A continuous-form electrophotographic printer for printing images on a continuous-form media, the media having a body and a leader section at one end of the body, the leader section being moved through the printer during an initializing load phase, the printer comprising:

a media motion assembly for moving a leader section of a continuous-form media at a selected velocity past an image transfer station, the leader section being sectioned into multiple media segments;

an image forming device at the image transfer station for placing multiple scan lines at a predetermined scan rate on a photoconductive image device, the image forming device forming an image on the photoconductive image device during a printing phase, but not forming an image on the photoconductive device during an initializing load phase; and an initialization speed control system which is calibrated by determining during the initializing load phase a desired constant media velocity for the continuous-form media to obtain an optimum number of scan lines per media segment, the speed control system moving the leader section at different constant velocities for consecutive media segments and counting an actual number of scan lines for each of the media segments, the speed control system comparing the actual number of scan lines to the optimum number of scan lines and calibrating the media motion assembly to move the media at the desired constant media velocity which causes the actual number of scan lines per media segment to equal the optimum number of scan lines per media segment, the calibration occurring during the initializing load phase prior to commencement of the printing phase;

the media motion assembly moving the media at the desired constant media velocity throughout the printing phase.

* * * * *